US011332113B2

(12) United States Patent
Ikuma et al.

(10) Patent No.: US 11,332,113 B2
(45) Date of Patent: May 17, 2022

(54) BRAKE ACTUATOR

(71) Applicant: TOYOTA JIDOSHA KABUSHIKI KAISHA, Toyota (JP)

(72) Inventors: Nao Ikuma, Nisshin (JP); Masaki Nanahara, Toyota (JP); Naoki Yabusaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 46 days.

(21) Appl. No.: 16/686,267

(22) Filed: Nov. 18, 2019

(65) Prior Publication Data
US 2020/0156612 A1 May 21, 2020

(30) Foreign Application Priority Data
Nov. 21, 2018 (JP) .............................. JP2018-218537

(51) Int. Cl.
*B60T 13/74* (2006.01)
*B60T 1/06* (2006.01)
(Continued)

(52) U.S. Cl.
CPC ............ *B60T 13/746* (2013.01); *B60T 1/065* (2013.01); *B60T 13/741* (2013.01); *F16C 19/188* (2013.01); *F16D 65/183* (2013.01); *F16H 1/32* (2013.01); *F16C 2380/26* (2013.01); *F16D 2121/24* (2013.01); *F16D 2125/40* (2013.01); *F16D 2125/50* (2013.01)

(58) Field of Classification Search
CPC ............. F16D 2125/36; F16D 2125/40; F16D 2121/24; F16D 2125/50; B60T 13/741; B60T 13/746
See application file for complete search history.

(56) References Cited

U.S. PATENT DOCUMENTS 5,829,557 A * 11/1998 Halasy-Wimmer ..... F16D 65/18
188/162
6,230,854 B1 * 5/2001 Schwarz ................. F16D 65/18
188/156
(Continued)

FOREIGN PATENT DOCUMENTS

DE 102017106306 A1 9/2017
EP 0444790 A2 9/1991
(Continued)

*Primary Examiner* — Nicholas J Lane
(74) *Attorney, Agent, or Firm* — Sughrue Mion, PLLC

(57) ABSTRACT

A brake actuator includes: a housing; an electric motor with a hollow motor shaft rotating; a rotating shaft disposed inside the motor shaft to be coaxial therewith; a piston with a rear end disposed inside the motor shaft and a front end engaged with the friction member; a speed reduction mechanism decelerating rotation transmitted from the motor shaft and transmitting the rotation to the rotating shaft; and a motion conversion mechanism converting a rotating motion of the rotating shaft into an advancing/retracting motion of the piston. The motor shaft is rotatably supported by the housing at an outer peripheral surface thereof, and the rotating shaft is rotatably supported by an inner peripheral surface of the motor shaft via rollers at an outer peripheral surface thereof as well as by the housing via a thrust bearing at a rear end of the rotating shaft.

6 Claims, 5 Drawing Sheets

(51) Int. Cl.
*F16C 19/18* (2006.01)
*F16D 65/18* (2006.01)
*F16H 1/32* (2006.01)
F16D 121/24 (2012.01)
F16D 125/40 (2012.01)
F16D 125/50 (2012.01)

(56) References Cited

U.S. PATENT DOCUMENTS

| | | | |
|---|---|---|---|
| 6,315,086 B1 * | 11/2001 | Schmitt | B60T 13/741 188/158 |
| 6,315,092 B1 * | 11/2001 | Schwarz | B60T 13/741 188/162 |
| 6,719,103 B1 * | 4/2004 | Kapaan | F16D 65/18 188/72.8 |
| 6,763,918 B1 * | 7/2004 | Kapaan | F16H 25/2204 188/72.8 |
| 6,907,967 B1 * | 6/2005 | Kapaan | F16H 25/22 188/162 |
| 7,779,971 B2 | 8/2010 | Adachi | |
| 8,136,641 B2 * | 3/2012 | Wang | F16D 65/18 188/72.8 |
| 9,145,934 B2 * | 9/2015 | Kim | B60T 13/741 |
| 2004/0035654 A1 | 2/2004 | Watanabe et al. | |
| 2004/0248688 A1 | 12/2004 | Shimada | |
| 2005/0077782 A1 | 4/2005 | Horiuchi et al. | |
| 2005/0119085 A1 * | 6/2005 | Becker | F16H 1/32 475/162 |
| 2008/0271553 A1 * | 11/2008 | Wang | F16D 65/18 74/89.34 |
| 2013/0126279 A1 * | 5/2013 | Yu | F16D 65/18 188/72.1 |
| 2017/0276197 A1 | 9/2017 | Yabusaki et al. | |
| 2018/0142747 A1 * | 5/2018 | Nanahara | F16D 65/18 |
| 2019/0293134 A1 * | 9/2019 | Nanahara | F16F 1/065 |
| 2020/0156612 A1 * | 5/2020 | Ikuma | F16H 1/32 |
| 2020/0158210 A1 * | 5/2020 | Nishigaya | B60T 13/746 |
| 2020/0240485 A1 * | 7/2020 | Nanahara | B60T 13/741 |
| 2020/0263768 A1 * | 8/2020 | Nanahara | F16D 55/226 |

FOREIGN PATENT DOCUMENTS

| | | |
|---|---|---|
| EP | 3550170 A1 | 10/2019 |
| JP | 2003-247576 A | 9/2003 |
| JP | 2003-294067 A | 10/2003 |
| JP | 2004-301235 A | 10/2004 |
| JP | 2006-63999 A | 3/2006 |
| JP | 2007-78174 A | 3/2007 |
| JP | 2009-133382 A | 6/2009 |
| JP | 2009-197958 A | 9/2009 |
| JP | 2012-2316 A | 1/2012 |
| JP | 2017-172722 A | 9/2017 |

* cited by examiner

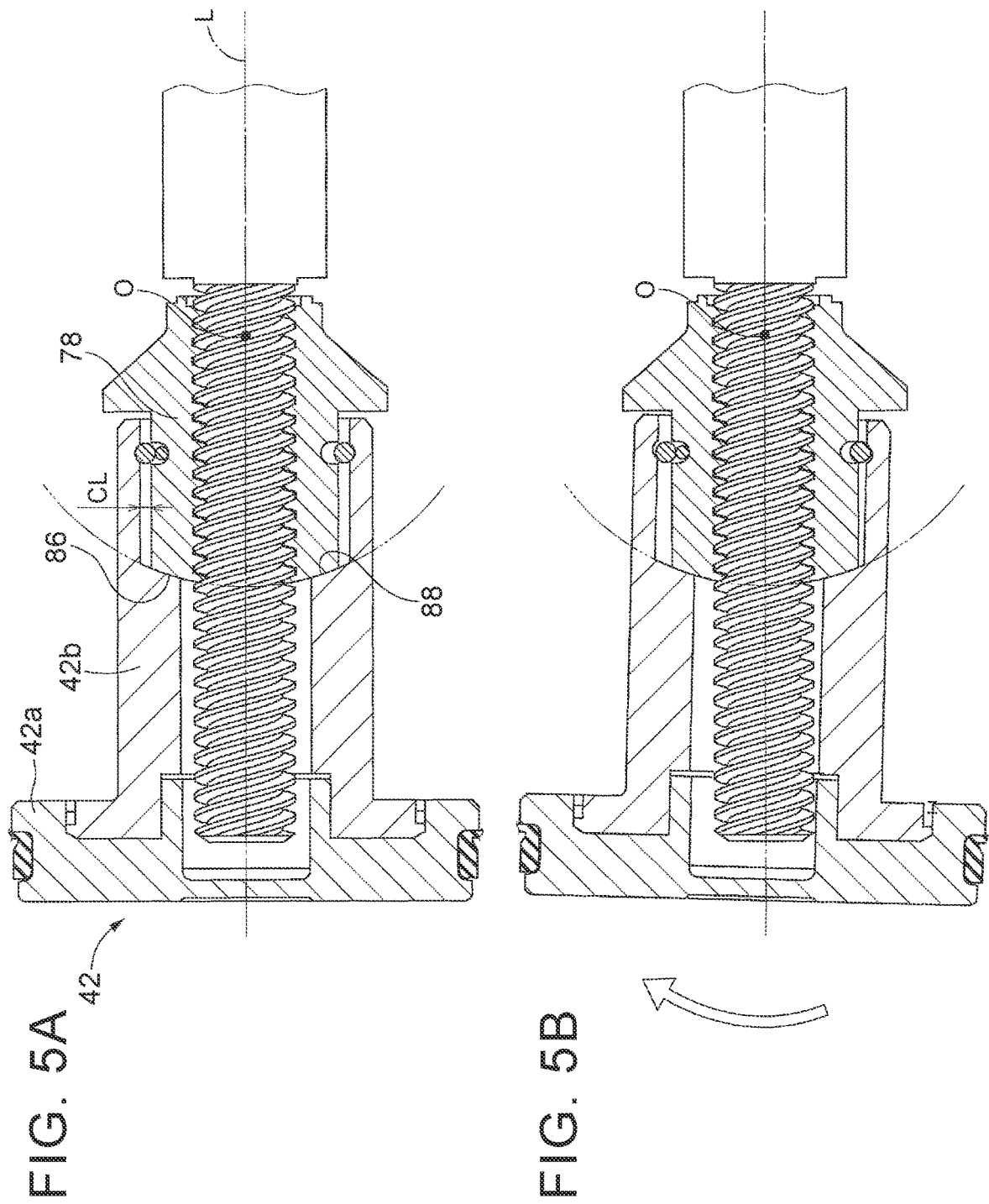

ized gear and the second external gear are disposed side by side in an axial direction, and the other of the first internal gear and the first external gear is provided on the housing, and the other of the second internal gear and the second external gear is provided on the rotating shaft.
BRAKE ACTUATOR

INCORPORATION BY REFERENCE

The disclosure of Japanese Patent Application No. 2018-218537 filed on Nov. 21, 2018 including the specification, drawings and abstract is incorporated herein by reference in its entirety.

BACKGROUND

1. Technical Field

The disclosure relates to a brake actuator employed in an electric brake device.

2. Description of Related Art

In recent years, development of electric brake devices, that is, brake devices that generate a braking force by pressing friction members against a rotating body with a force generated by an electric motor, has been actively performed. For example, a brake actuator as described in Japanese Unexamined Patent Application Publication No. 2009-197958 (JP 2009-197958 A) is under consideration as a brake actuator that can be adopted for the electric brake device.

SUMMARY

In the brake actuator described in JP 2009-197958 A, rotation of a motor shaft of the electric motor is transmitted to a rotating shaft via a speed reduction mechanism. The rotation of the rotating shaft is converted into an advancing and retracting motion of a piston by a motion conversion mechanism including a screw mechanism, and the advancement of the piston presses the friction members against the disc rotor serving as the rotating body. The motor shaft is hollow, and the rotating shaft and the piston are disposed inside the motor shaft so as to be coaxial with the motor shaft. This makes the brake actuator in JP 2009-197958 A compact. The disclosure provides a brake actuator with improved practicability.

An aspect of the disclosure relates to a brake actuator for pressing a friction member against a rotating body that rotates with a vehicle wheel. The brake actuator includes: a housing; an electric motor in which a hollow motor shaft rotates; a rotating shaft disposed inside the motor shaft so as to be coaxial with the motor shaft; a piston having a rear end that is disposed inside the motor shaft and a front end that is engaged with the friction member; a speed reduction mechanism configured to decelerate rotation transmitted from the motor shaft and transmit the rotation to the rotating shaft; and a motion conversion mechanism configured to convert a rotating motion of the rotating shaft into an advancing and retracting motion of the piston. The motor shaft is rotatably supported by the housing at an outer peripheral surface of the motor shaft, and the rotating shaft is rotatably supported by an inner peripheral surface of the motor shaft via rollers at an outer peripheral surface of the rotating shaft as well as rotatably supported by the housing via a thrust bearing at a rear end of the rotating shaft.

In the above aspect, the thrust bearing may be a thrust ball bearing.

In the above aspect, the thrust bearing may have a structure in which rolling elements are held between two washers, and relative displacement between one of the two washers and the rotating shaft in a radial direction may be inhibited, and relative displacement between the other of the two washers and the housing in the radial direction may be inhibited.

In the above aspect, the rotating shaft may have a flange at the rear end, and the rotating shaft may be rotatably supported, at the flange, by the housing via the thrust bearing.

In the above aspect, the speed reduction mechanism may include a first internal planetary gear mechanism and a second internal planetary gear mechanism, the first internal planetary gear mechanism having a first internal gear and a first external gear that contacts the first internal gear from inside to mesh with the first internal gear, the second internal planetary gear mechanism having a second internal gear and a second external gear that contacts the second internal gear from inside to mesh with the second internal gear. The speed reduction mechanism may include a planetary gear body that is rotatably supported by an eccentric shaft portion of the motor shaft and in which one of the first internal gear and the first external gear and one of the second internal gear and the second external gear are disposed side by side in an axial direction, and the other of the first internal gear and the first external gear is provided on the housing, and the other of the second internal gear and the second external gear is provided on the rotating shaft.

In the above aspect, the first internal gear and the second internal gear may each have an arc-shaped tooth profile, and the first external gear and the second external gear may each have an epitrochoidal parallel curved tooth profile.

In the above aspect, the eccentric shaft portion, by which the planetary gear body is rotatably supported, may be provided at a rear end of the motor shaft, the rotating shaft may have a flange at the rear end of the rotating shaft, and an outer periphery of the flange may be provided with the other of the second internal gear and the second external gear.

In the above aspect, the first internal gear may be fixedly supported by the housing, the first external gear may be provided on an outer periphery of the planetary gear body, the second internal gear may be provided on an inner periphery of the planetary gear body, and the second external gear may be provided on the rotating shaft.

In the above aspect, the motion conversion mechanism may include: one of an external thread and an internal thread, which is provided on the rotating shaft; and a movable body that has the other of the external thread and the internal thread that is screwed with the one of the external thread and the internal thread, that is non-rotatable and configured to advance and retract, and that comes into contact with the piston. Radial displacement of contact faces of the movable body and the piston may be permitted, the contact faces contacting each other.

In the above aspect, the contact faces of the movable body and the piston may constitute a part of a spherical surface centered on a point on an axis of the brake actuator, the contact faces contacting each other.

The brake actuator of the above aspect has advantages besides its compactness. That is, the brake actuator can suppress inclination of the rotating shaft as well as securely receive a thrust load acting on the rotating shaft due to pressing of the friction member against the rotating body while maintaining a smooth rotation of the rotating shaft.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5A is a diagram for illustrating a piston inclination permitting mechanism of the brake actuator according to the embodiment; and FIG. 5B is a diagram for illustrating the piston inclination permitting mechanism of the brake actuator according to the embodiment.

DETAILED DESCRIPTION OF EMBODIMENTS

Hereinafter, a brake actuator according to an embodiment of the disclosure will be described in detail with reference to the drawings. Besides the following embodiments, the disclosure can be carried out in various forms in which various modifications and improvements are made based on the knowledge of those skilled in the art.

Electric Brake Device Including Brake Actuator

Figure 1:
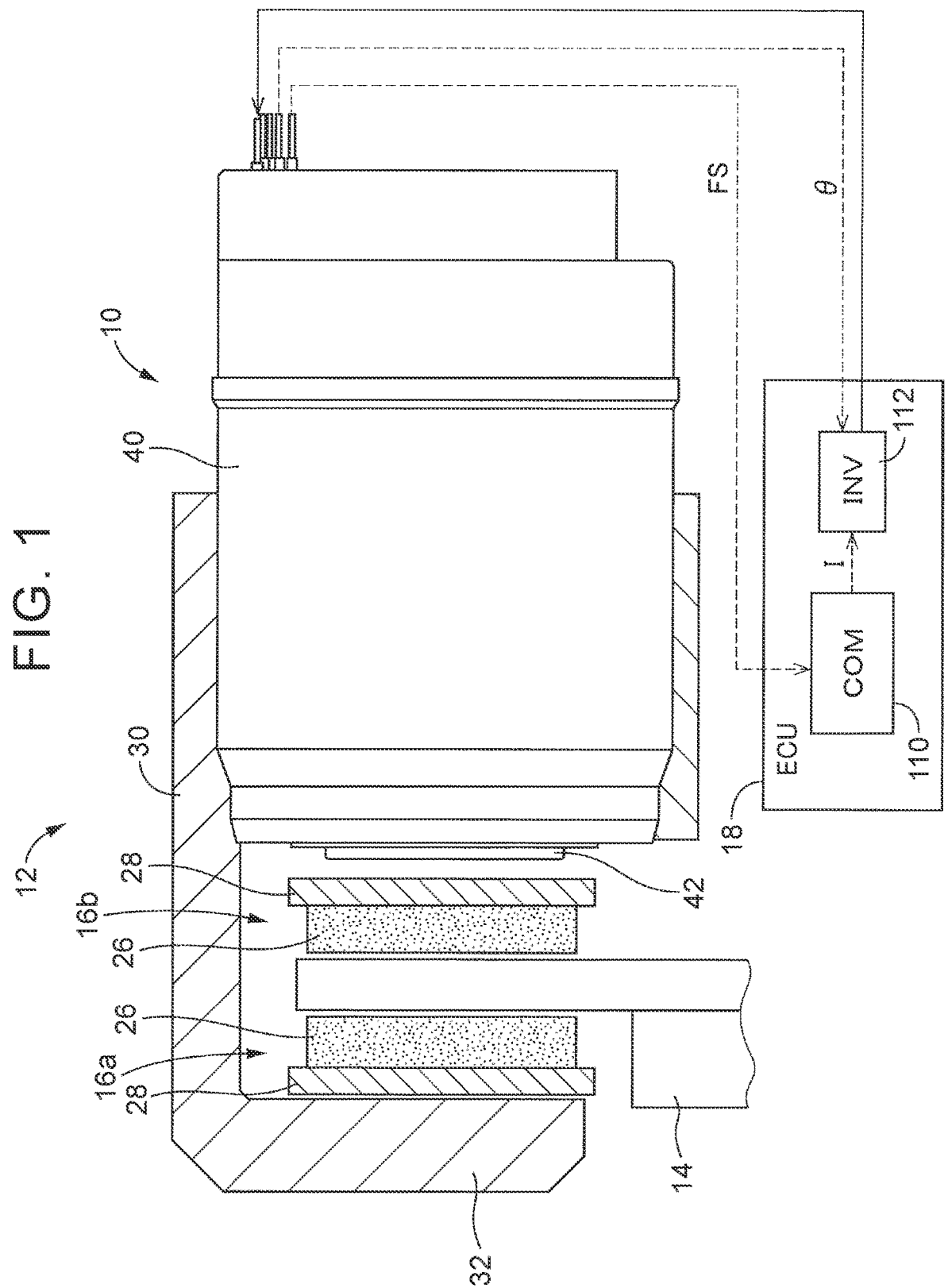
FIG. 1 shows an electric brake device including a brake actuator according to an embodiment of the disclosure.

As shown in FIG. 1, a brake actuator (hereinafter, sometimes simply referred to as "actuator") 10 of the embodiment is a main component of an electric brake device. The electric brake device includes a brake caliper 12 (hereinafter, sometimes simply referred to as "caliper 12") holding the actuator 10, a disc rotor 14 serving as a rotating body that rotates with a vehicle wheel, a pair of brake pads (hereinafter, sometimes simply referred to as "pads") 16a, 16b, and an electronic control unit (hereinafter, sometimes referred to as "ECU") 18 serving as a controller that will be described in detail later.

The caliper 12 is held by a mount (not shown) so as to extend across the disc rotor 14 and to be movable along an axial direction (a right-left direction in FIG. 1). The mount is provided on a carrier (not shown) that holds a wheel so that the wheel is rotatable. The pads 16a, 16b are held by the mount so that the pads 16a, 16b are movable in the axial direction and the disc rotor 14 is sandwiched between the pads 16a and 16b. Each of the pads 16a, 16b includes a friction member 26 on a side thereof to contact the disc rotor 14 and a backup plate 28 supporting the friction member 26. The friction member 26 of each of the pads 16a, 16b is pressed against the disc rotor 14.

For convenience, description will be made assuming that the left side in FIG. 1 represents a front side and the right side in FIG. 1 represents a rear side. The front pad 16a is supported by a claw 32 that is a front end part of a caliper body 30. The actuator 10 is held by a rear portion of the caliper body 30 so as to be fixed at a housing 40 thereof. The actuator 10 has a piston 42 that advances and retracts with respect to the housing 40. As the piston 42 advances, a tip end, specifically, a front end of the piston 42 engages with the rear pad 16b, specifically, the backup plate 28 of the pad 16b. When the piston 42 in an engaged state further advances, the pair of pads 16a, 16b hold the disc rotor 14.

In other words, the friction member 26 of each pad 16a, 16b is pressed against the disc rotor 14. This pressing generates a braking force to the rotation of the wheel, which depends on a frictional force between the disc rotor 14 and the friction member 26, that is, a braking force for decelerating and stopping a vehicle.

Basic Configuration of Brake Actuator

Figure 2:
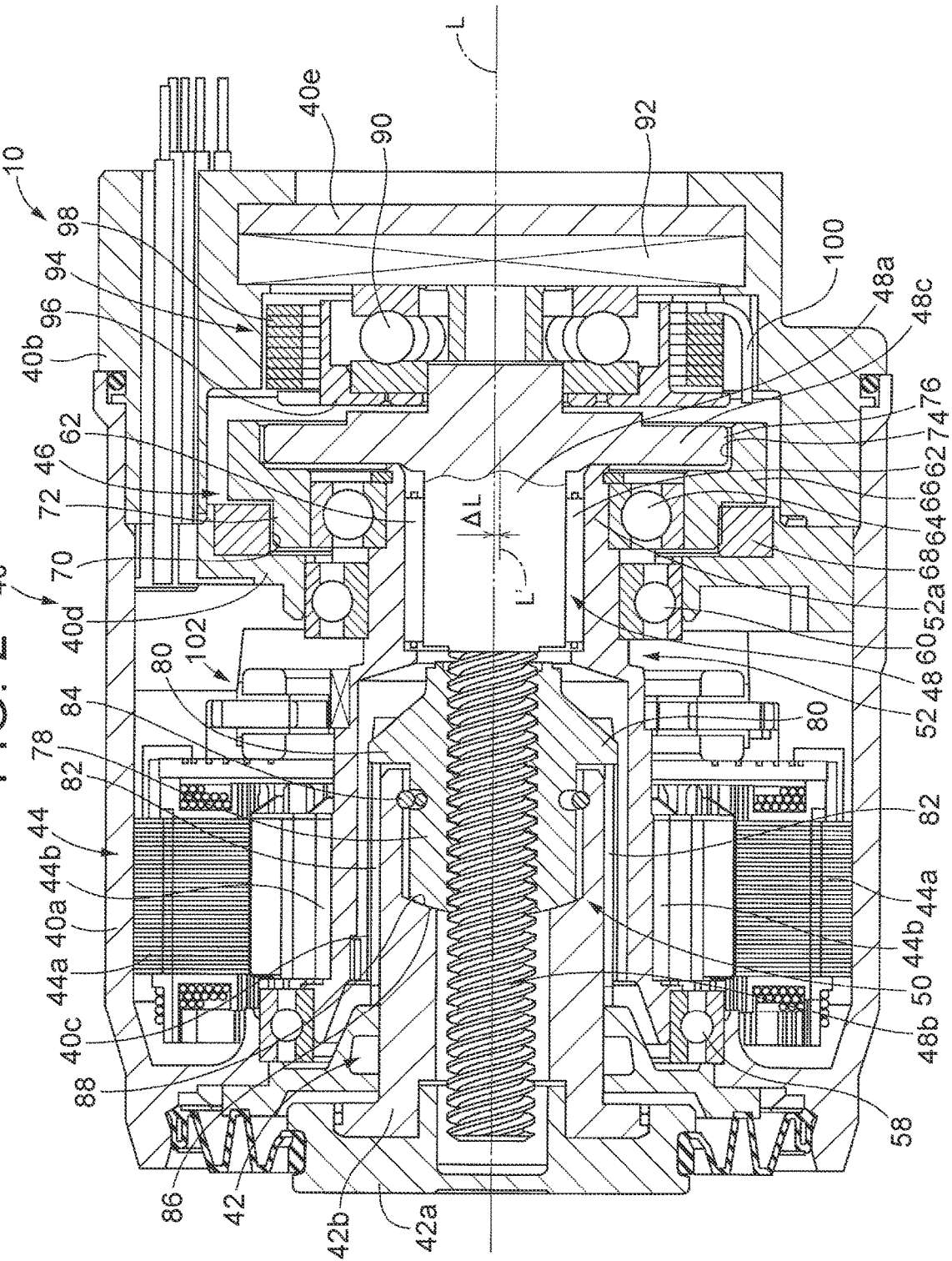
FIG. 2 is a sectional view showing a structure of the brake actuator according to the embodiment.

As shown in FIG. 2, the actuator 10 includes, besides the housing 40 and the piston 42, an electric motor (three-phase DC brushless motor) 44 serving as a drive source, a speed reduction mechanism 46 for decelerating the rotation transmitted from the electric motor 44, a rotating shaft 48 that rotates with the rotation of the electric motor 44, which has been decelerated by the speed reduction mechanism 46, a motion conversion mechanism 50 that converts a rotating motion of the rotating shaft 48 into an advancing and retracting motion (forward and backward motion) of the piston 42, and the like. In the following description, the left side in FIG. 2 will be referred to as the front side, and the right side in FIG. 2 will be referred to as the rear side, for convenience.

Specifically, the housing 40 includes a front case 40a, a rear case 40b, an inner cylinder 40c, a support wall 40d, a support plate 40e, and the like. The front case 40a and the rear case 40b each have a generally cylindrical shape. The inner cylinder 40c has a front end supported by the front case 40a, and the piston 42 is disposed inside the inner cylinder 40c. The support wall 40d having a generally cylindrical shape is disposed inside the front case 40a and supported by a front end of the rear case 40b. The support plate 40e is fixed and held by a rear end of the rear case 40b.

The piston 42 includes a piston head 42a and a hollow piston cylinder 42b. The piston 42 is engaged, at a front end of the piston head 42a serving as the tip end of the piston 42, with the friction member 26 of the brake pad 16b via the backup plate 28. The actuator 10 has a hollow shaft 52 having a cylindrical shape. A front part of the hollow shaft 52 mainly functions as a motor shaft (rotor) that is a rotational drive shaft of the electric motor 44, and a rear part of the hollow shaft 52 mainly functions as an input shaft of the speed reduction mechanism 46 described later in detail. That is, the electric motor 44 can be considered as a type of motor in which a hollow motor shaft rotates. In the following description, the hollow shaft 52 can be considered as a shaft formed by integrating the motor shaft of the electric motor 44 and the input shaft of the speed reduction mechanism 46 rotated by the electric motor 44. In short, the hollow shaft 52 itself can be considered as the input shaft of the speed reduction mechanism 46, or the hollow shaft 52 itself can be considered as the motor shaft of the electric motor 44. The electric motor 44 has coils 44a and magnets 44b. The coils 44a are fixed and held by the front case 40a of the housing 40 so as to be placed inside the front case 40a. The magnets 44b are provided on an outer periphery of the front part of the hollow shaft 52 so as to face the coils 44a.

The hollow shaft 52 is disposed such that the inner cylinder 40c is located inside the front part of the hollow shaft 52. The hollow shaft 52 is supported by the housing 40 via two radial ball bearings 58, 60 so as to be rotatable about an axis L that is a central axis of the actuator 10 and so as to be immovable in an axial direction in which the axis L extends. Specifically, a front end of the hollow shaft 52 is supported by the front case 40a via the radial ball bearing 58, and a rear end of the hollow shaft 52 is supported by the support wall 40d via the radial ball bearing 60. In other words, the hollow shaft 52 serving as the motor shaft is rotatably supported by the housing 40 at an outer peripheral surface of the hollow shaft 52. Regarding a positional relationship between the hollow shaft 52 serving as the motor shaft and the piston 42, a rear end of the piston 42 is disposed inside the hollow shaft 52.

The rotating shaft 48 is disposed inside the hollow shaft 52 serving as the motor shaft so as to be coaxial with the hollow shaft 52. The rotating shaft 48 includes three parts, namely, an output shaft portion 48*a* functioning as an output shaft of the speed reduction mechanism 46, an external thread portion 48*b* provided on a front side of the output shaft portion 48*a*, and a flange portion 48*c* provided on a rear end of the output shaft portion 48*a*. The three parts are integrated together. The rotating shaft 48 is supported, at the output shaft portion 48*a* thereof, inside the hollow shaft 52 via rollers (also referred to as "needles") 62 so as to be rotatable about the axis L. That is, the rotating shaft 48 is supported, at an outer peripheral surface thereof, by an inner peripheral surface of the hollow shaft 52 serving as the motor shaft via the rollers 62. The rollers 62 can be considered to constitute a radial bearing.

The speed reduction mechanism 46 includes a planetary gear body 66 supported by the rear part of the hollow shaft 52 via the radial ball bearing 64 so as to be rotatable but immovable in the axial direction, besides the hollow shaft 52 functioning as the input shaft and the rotating shaft 48 in which the output shaft portion 48*a* functions as the output shaft. A rear end of the hollow shaft 52 (hereinafter, sometimes referred to as "eccentric shaft portion 52*a*"), which supports at its outer periphery the planetary gear body 66 via the radial ball bearing 64, has an axis L' (hereinafter, sometimes referred to as "eccentric axis L'") defined by the outer peripheral surface. The axis L' is decentered with respect to the axis L by an eccentricity amount ΔL. Thus, the planetary gear body 66 rotates around the eccentric axis L' as well as revolves around the axis L along with rotation of the hollow shaft 52 around the axis L.

Figure 3B:
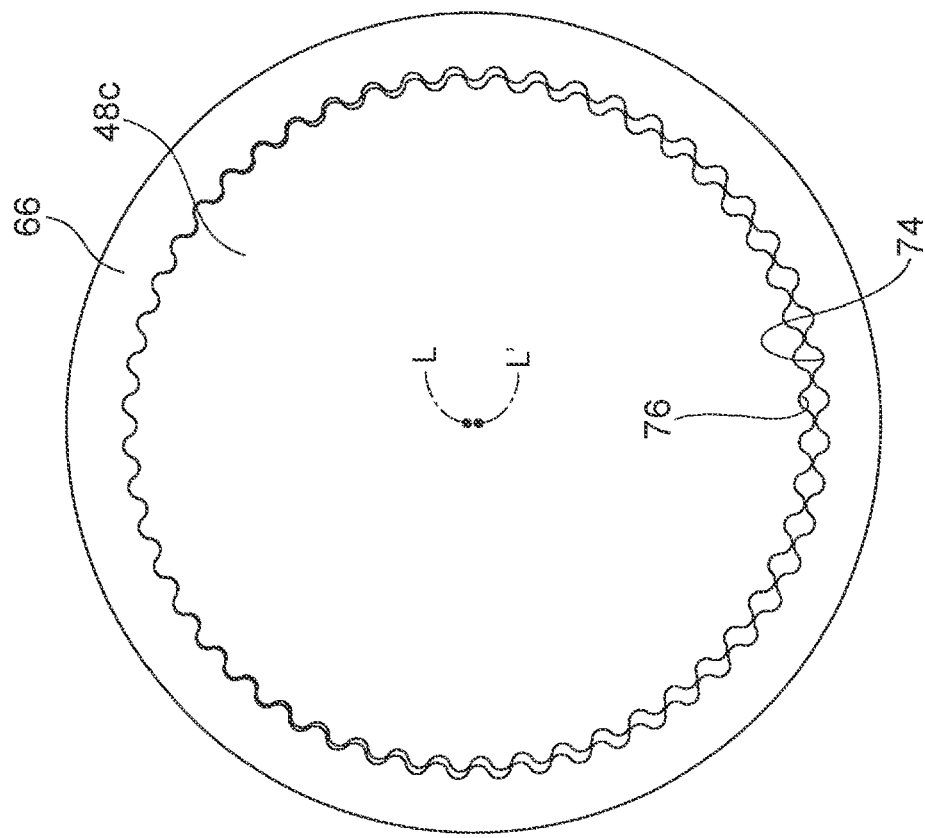
FIG. 3B is a diagram for illustrating the speed reduction mechanism included in the brake actuator according to the embodiment.
Figure 3A:
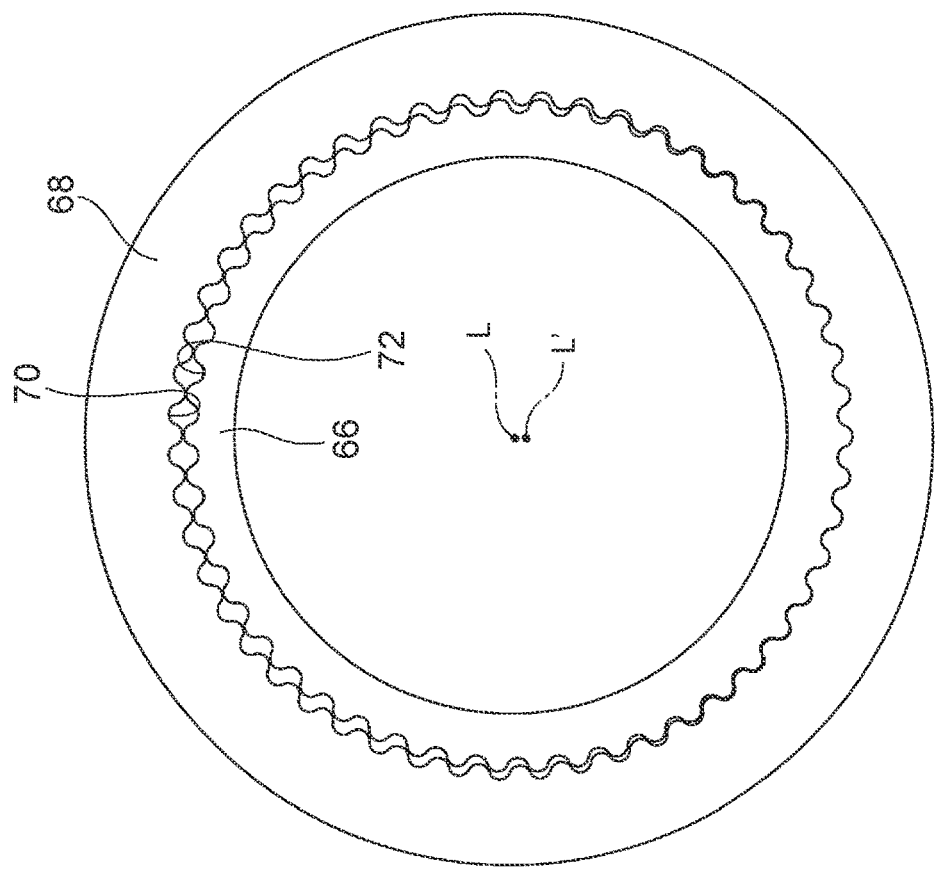
FIG. 3A is a diagram for illustrating a speed reduction mechanism included in the brake actuator according to the embodiment.

The speed reduction mechanism 46 includes a ring gear body 68 fixedly supported by the support wall 40*d* of the housing 40. As shown in FIG. 3A, the ring gear body 68 has a first internal gear 70, and an outer periphery of the planetary gear body 66 is provided with a first external gear 72 that meshes with a part of the first internal gear 70. Further, as shown in FIG. 3B, a second internal gear 74 is provided on an inner periphery of the planetary gear body 66 so that the first external gear 72 and the second internal gear 74 are arranged side by side in the axial direction. An outer periphery of the flange portion 48*c* of the rotating shaft 48 is provided with a second external gear 76, a part of which meshes with a part of the second internal gear 74.

The center of the first internal gear 70 is positioned on the axis L, the center of the first external gear 72 is positioned on the eccentric axis L', the center of the second internal gear 74 is positioned on the eccentric axis L', and the center of the second external gear 76 is positioned on the axis L. A meshing point of the first internal gear 70 and the first external gear 72 and a meshing point of the second internal gear 74 and the second external gear 76 are positioned on the opposite sides of the axis L or the eccentric axis L', namely, at positions (phases) offset by 180 degrees from each other in the circumferential direction. That is, the speed reduction mechanism 46 is a differential reduction gear including a first internal planetary gear mechanism and a second internal planetary gear mechanism. The first internal planetary gear mechanism has the first internal gear 70 and the first external gear 72 that contacts the first internal gear 70 from inside to mesh with the first internal gear 70. The second planetary internal gear mechanism has the second internal gear 74 and the second external gear 76 that contacts the second internal gear 74 from inside to mesh with the second internal gear 74.

The first internal gear 70 has an arc-shaped tooth profile, and the first external gear 72 has an epitrochoidal parallel curved tooth profile. Similarly, the second internal gear 74 has an arc-shaped tooth profile, and the second external gear 76 has an epitrochoidal parallel curved tooth profile. Therefore, the speed reduction mechanism 46 is configured as a cycloid reducer (sometimes referred to as "Cyclo (registered trademark) reducer"). Thus, in the speed reduction mechanism 46, the number of teeth of the first internal gear 70 and the number of teeth of the first external gear 72 differ by only one, and the number of teeth of the second internal gear 74 and the number of teeth of the second external gear 76 differ by only one. Thus, the speed reduction mechanism 46 is a speed reduction mechanism with a high reduction ratio, that is, the speed reduction mechanism 46 has a significantly small ratio of the rotation speed of the rotating shaft 48 serving as the output shaft with respect to the rotation speed of the hollow shaft 52 serving as the input shaft, thereby providing a smooth speed reduction.

As shown in FIG. 2, the motion conversion mechanism 50 includes the rotating shaft 48, more specifically, the external thread portion 48*b* of the rotating shaft 48, and a nut 78 serving as a movable body screwed with the external thread portion 48*b*. The external thread formed in the external thread portion 48*b* and the internal thread formed in the nut 78 are trapezoidal threads provided as multiple threads (three threads in the actuator 10). On an outer periphery of the nut 78, two projections 80 functioning as keys are provided. The two projections 80 are engaged with two slots 82 provided in the inner cylinder 40*c* of the housing 40 so as to extend in the axial direction. The engagement between the projections 80 and the slots 82 suppresses rotation of the nut 78 about the axis L and allows the nut 78 to move in the axial direction. A configuration may be employed, in which the rotating shaft 48 has an internal thread, and a movable body has an external thread screwed with the internal thread, and advances and retracts with the rotation of the rotating shaft 48.

A front part of the nut 78 serving as the movable body is inserted into the piston cylinder 42*b* of the piston 42 from the rear, and a locking ring 84 inhibits the piston 42 from coming out of the nut 78. A front end face 86 of the nut 78 is in contact with a receiving face 88 formed inside the piston cylinder 42*b*. An advancing force of the nut 78 is transmitted as an advancing force of the piston 42 via the front end face 86 and the receiving face 88 which are contact faces in contact with each other. The advancing force of the piston 42 functions as a pressing force, with which the piston 42 presses the friction members 26 of the brake pads 16*a*, 16*b* against the disc rotor 14. Due to uneven wear of the friction members 26 of the brake pads 16*a*, 16*b*, inclination of the disc rotor 14 caused by turning of the vehicle, or the like, a force that causes the piston 42 to be inclined in the radial direction may act on the piston 42 when the piston 42 is pressing the friction members 26. In that case, by permitting radial displacement between the front end face 86 and the receiving face 88, the inclination of the piston 42 is permitted to some extent. A mechanism for permitting the inclination of the piston 42, namely, a piston inclination permitting mechanism will be described in detail later.

The rotating shaft 48 is supported, at the flange portion 48*c* provided at the rear end of the rotating shaft 48, by the housing 40 via a thrust bearing, specifically, a thrust ball bearing 90. More specifically, a pressing force sensor 92 for detecting the pressing force (axial force) is disposed between the thrust ball bearing 90 and the support plate 40e. The rotating shaft 48 is supported by the support plate 40e of the housing 40 also through the pressing force sensor 92. The structure of the pressing force sensor 92 and the support structure through the pressing force sensor 92 are not shown in FIG. 2. More specifically, an inner race 96 that is a component of an urging mechanism 94 described later is disposed between the thrust ball bearing 90 and the flange portion 48c of the rotating shaft 48. A slight clearance is present between the inner race 96 and the flange portion 48c (shown in an exaggerated manner in FIG. 2). When the piston 42 advances and presses the friction members 26 against the disc rotor 14, the rotating shaft 48 slightly retracts due to a reaction force of the pressing force. Then, the flange portion 48c comes into contact with a front end face of the inner race 96, whereby the clearance is eliminated. Thus, the rotating shaft 48 is supported by the housing 40 via the thrust ball bearing 90 at the rear end of the rotating shaft 48, that is, at the flange portion 48c.

The urging mechanism 94 includes the inner race 96 described above and a torsion coil spring 98 disposed in the rear case 40b of the housing 40. One end 100 of the torsion coil spring 98 is fixed to the rear case 40b, and the other end (not shown) is fixed to the inner race 96. When the piston 42 advances and presses the friction members 26 against the disc rotor 14, that is, when the braking force is generated, the clearance is eliminated and the inner race 96 starts rotating together with the rotating shaft 48. With an increase in the braking force, that is, with further rotation of the rotating shaft 48, the inner race 96 further rotates. This rotation causes the torsion coil spring 98 to be twisted. An elastic reaction force of the torsion coil spring 98 acts on the rotating shaft 48 as a rotational urging force in a direction in which the piston 42 retracts. Even if the electric motor 44 can not generate the rotational driving force while the braking force is generated due to this rotation urging force, for example, the piston 42 retracts to a retraction end, that is, generally to a position of the piston 42 shown in FIG. 2. This suppresses a phenomenon in which the disc rotor 14 rotates while the friction members 26 are pressed against the disc rotor 14 (so-called "dragging").

Although illustration of a detailed structure is omitted, the pressing force sensor 92 mainly includes a load cell. The actuator 10 includes, in addition to the pressing force sensor 92, a rotation angle sensor 102 for detecting a rotation angle (rotational phase) of the hollow shaft 52 that is the motor shaft. The rotation angle sensor 102 is a resolver.

As shown in FIG. 1, the ECU 18 serving as a control device includes a computer 110 having a central processing unit (CPU), a random access memory (RAM), a read-only memory (ROM), and the like, and an inverter 112 serving as a drive circuit (driver) of the electric motor 44. A pressing force FS detected by the pressing force sensor 92 and a rotation angle θ of the hollow shaft 52 detected by the rotation angle sensor 102 are sent to the computer 110 and the inverter 112. Control of the actuator will be briefly described. The computer 110 determines, for example, a necessary braking force that is a braking force to be generated by the electric brake device, in accordance with the degree of operation of a brake operation member such as a brake pedal. Based on the necessary braking force, the computer 110 determines a target pressing force that is a target of the pressing force FS. Then, the computer 110 determines a target supply current that is a current I to be supplied to the electric motor 44 so that the detected pressing force FS matches the target pressing force. In accordance with the target supply current, the inverter 112 controls the electric motor 44 based on the detected rotation angle θ.

In the actuator 10, the rotating shaft 48, the piston 42, and the electric motor 44 are coaxially provided in this order from the center of the actuator 10 toward the outside. The axial dimensions of the rotating shaft 48, the piston 42, and the electric motor 44 decrease in this order. That is, the actuator 10 is a compact actuator. Thus, the electric brake device including the actuator 10 is also compact.

Characteristic Configuration of Brake Actuator

The actuator 10 according to the embodiment includes the support structure for the rotating shaft 48 and the piston inclination permitting mechanism. Hereinafter, the support structure and the piston inclination permitting mechanism will be described in detail.

Support Structure for Rotating Shaft

Figure 4:
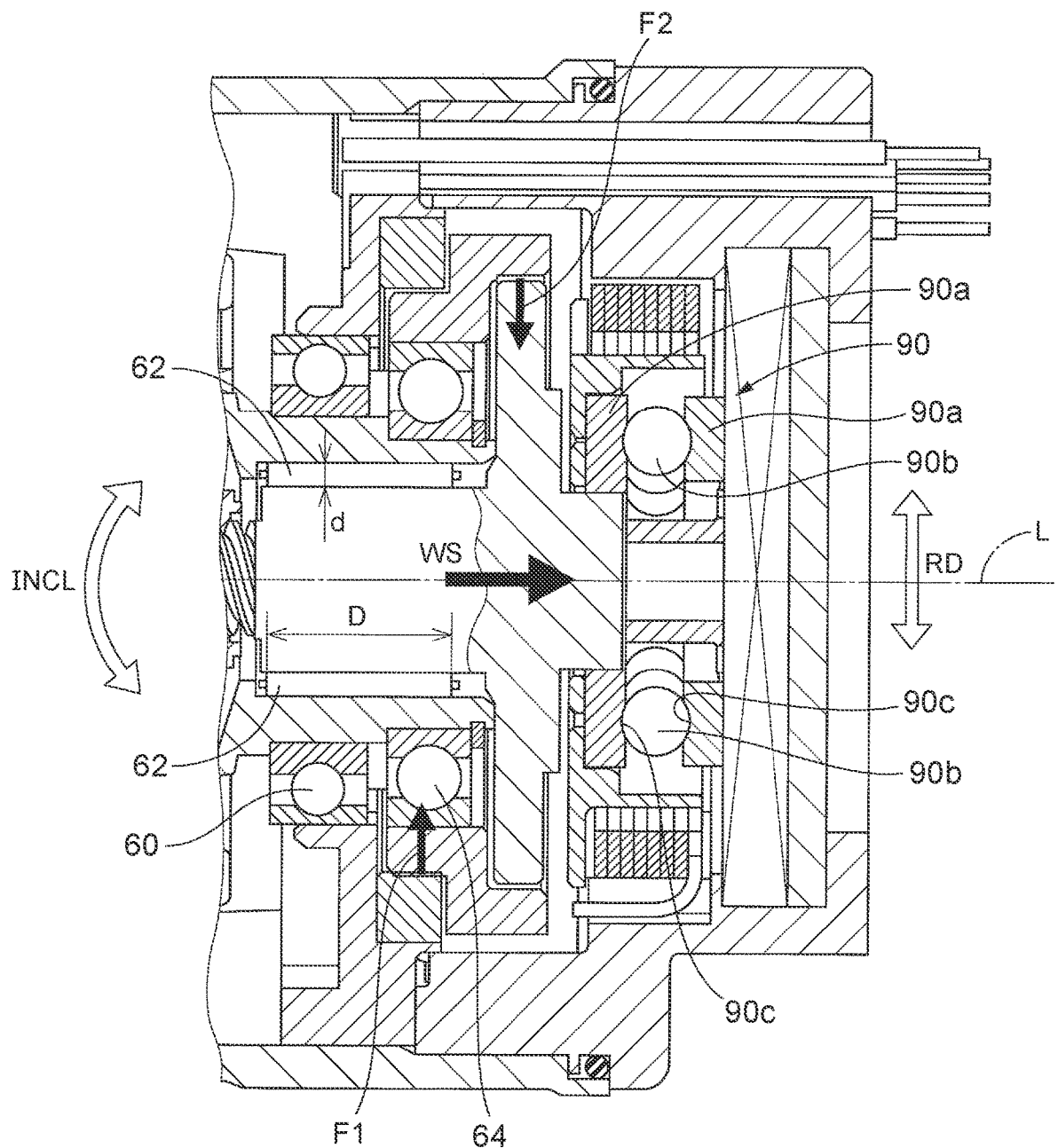
FIG. 4 is a diagram for illustrating a structure to support a rotating shaft included in the brake actuator according to the embodiment.

Referring to FIG. 4, in the actuator 10, the rotating shaft 48 is rotatably supported, with rollers 62 interposed between a part of the outer peripheral surface of the rotating shaft 48 and the inner peripheral surface of the hollow shaft 52 serving as the motor shaft as described above. In particular, the rotating shaft 48 is supported via the bare rollers 62 rather than a radial roller bearing including an outer race and an inner race. A diameter d of the rollers 62 is relatively small. Therefore, a distance between the inner peripheral surface of the hollow shaft 52 and the outer peripheral surface of the rotating shaft 48 is set smaller than a distance at which the radial ball bearings 60, 64 disposed on the outer peripheral surface of the hollow shaft 52. The radial dimension of the actuator 10 is accordingly set smaller.

Since a length D of the rollers 62 is significantly long, the rotating shaft 48 is supported by the hollow shaft 52 over a long distance in the axial direction. In the case of supporting the rotating shaft 48 via the radial ball bearing, an inclination INCL of the rotating shaft 48 with respect to the hollow shaft 52 (a motion indicated by a white arrow at the left in FIG. 4) can not be sufficiently suppressed unless a plurality of radial ball bearings are provided so as to be separate from each other in the axial direction. In contrast, in the case of supporting the rotating shaft 48 via the rollers 62, the inclination INCL can be effectively suppressed even with the support at one point because the length of support in the axial direction is long.

Further, in the rotating shaft 48, a reaction force of the pressing force FS that is a force with which the piston 42 presses the friction members 26 against the disc rotor 14, that is, a thrust force (axial force) WS acts as shown in FIG. 4. In order to secure the rotation of the rotating shaft 48 receiving the thrust force WS, the rotating shaft 48 is supported by the housing 40, specifically, the support plate 40e of the housing 40, via the thrust ball bearing 90 that is a kind of thrust bearing. The rotating shaft 48 is supported at the flange portion 48c provided at the rear end thereof. Thus, in the actuator 10, the thrust ball bearing 90 having a relatively large diameter can be employed, and if a large thrust force WS caused by a large braking force acts on the rotating shaft 48, the rotating shaft 48 can be firmly supported.

The thrust ball bearing 90 includes two washers 90a each of which is a bearing washer, a plurality of bearing balls 90b (rolling elements) held between the washers 90a, and a retainer (not shown) for maintaining arrangement positions of the bearing balls 90b in the circumferential direction. As can be seen from FIG. 4, a rearmost part of the rotating shaft 48 is inserted into one of the two washers 90a. Thus, relative displacement between the one washer 90a and the rotating shaft 48 in the radial direction is inhibited. Although not shown clearly in FIG. 4, relative displacement between the other of the two washers 90a and the support plate 40e in the radial direction is also inhibited.

Respective one faces of the two washers 90a, which face each other, are provided with an annular raceway groove 90c for guiding rolling of the bearing balls 90b. The raceway groove 90c has such a shape that the bearing balls 90b just fit. The bearing balls 90b roll on the raceway grooves 90c of the two washers 90a. Therefore, even if a force causing relative displacement of the two washers 90a in the radial direction acts while the thrust force WS is acting, a force for inhibiting the relative displacement of the two washers 90a in the radial direction, namely, an aligning force acts on the two washers 90a because of operation of the bearing balls 90b and the raceway grooves 90c. This aligning force suppresses radial displacement RD of the rotating shaft 48 shown by the white arrow at the right in FIG. 4.

Suppression of the radial displacement RD of the rotating shaft 48 largely contributes to suppression of the inclination INCL of the rotating shaft 48. That is, the inclination of the rotating shaft 48 is reliably suppressed by the support via the rollers 62 and the support via the thrust ball bearing 90 which is a thrust bearing configured to generate the aligning force. It is also possible to employ an angular contact thrust roller bearing as a thrust bearing configured to generate the aligning force, instead of the thrust ball bearing 90.

In the actuator 10, the speed reduction mechanism 46 is a differential reduction gear as described above. Thus, in the present actuator 10, a meshing force F1 acts on the rotating shaft 48 at the meshing point between the first internal gear 70 and the first external gear 72, as shown in FIG. 4. Also, a meshing force F2 acts on the rotating shaft 48 at a meshing point between the second internal gear 74 and the second external gear 76. The meshing forces F1, F2 act at different points in the axial direction so as to become a force to cause the rotating shaft 48 to be inclined. Therefore, the support structure that effectively suppresses the inclination INCL of the rotating shaft 48, that is, the structure of the support via the rollers 62 and the thrust ball bearing 90 that is a thrust bearing, may be used in an actuator including a differential reduction gear as the speed reduction mechanism.

Piston Inclination Permitting Mechanism

The piston inclination permitting mechanism will be described in detail with reference to FIGS. 5A and 5B. As described above, the front part of the nut 78 serving as the movable body is inserted into the piston cylinder 42b of the piston 42 from the rear, and the front end face 86 of the nut 78 is in contact with the receiving face 88 formed inside the piston cylinder 42b. Although shown in an exaggerated manner in FIG. 5A, a clearance CL is provided between an outer peripheral surface of the nut 78 and an inner peripheral surface of the piston cylinder 42b, which faces the outer peripheral surface of the nut 78. Therefore, when a force acts on the piston 42 to displace the piston 42 in the radial direction, radial displacement of the piston 42 is permitted because of the presence of the clearance CL.

The front end face 86 of the nut 78 and the receiving face 88 of the piston cylinder 42b are configured to closely fit each other, and the front end face 86 and the receiving face 88 form a spherical surface centered on a point O on the axis L. Therefore, when a radial force acts on the piston 42 receiving the reaction force of the pressing force FS, the piston 42 is inclined such that the receiving face 88 slides along the front end face 86 of the nut 78 as shown in FIG. 5B. As a mechanism providing such function, the actuator 10 is provided with the piston inclination permitting mechanism including the end face 86 and the receiving face 88.

The piston 42 may receive a radial force while the braking force is generated, due to uneven wear of the friction members 26, inclination of the disc rotor 14 caused by turning of the vehicle, or the like. In such a case, the piston inclination permitting mechanism permits a smooth inclination of the piston 42, thereby reducing an excessive load or burden on the actuator 10.

EXAMPLES OF ASPECTS OF THE DISCLOSURE (1) A brake actuator for pressing a friction member against a rotating body that rotates with a vehicle wheel to generate a braking force includes: a housing; an electric motor in which a hollow motor shaft rotates; a rotating shaft disposed inside the motor shaft so as to be coaxial with the motor shaft; a piston having a rear end that is disposed inside the motor shaft and a front end that is engaged with the friction member; a speed reduction mechanism configured to decelerate rotation transmitted from the motor shaft and transmit the rotation to the rotating shaft; and a motion conversion mechanism configured to convert a rotating motion of the rotating shaft into an advancing and retracting motion of the piston.

The item (1) provides a mode relating to the configuration that is the premise of the claimable disclosure. The brake actuator of the item (1) (hereinafter, sometimes simply referred to as "actuator") is a compact actuator because the rear end of the piston and the rotating shaft are disposed in the hollow motor shaft.

(2) In the brake actuator according to the item (1), the motor shaft is rotatably supported by the housing at an outer peripheral surface of the motor shaft, and the rotating shaft is rotatably supported by an inner peripheral surface of the motor shaft via rollers at an outer peripheral surface of the rotating shaft as well as rotatably supported by the housing via a thrust bearing at a rear end of the rotating shaft.

In the mode of the item (2), the rotating shaft is supported, via the rollers (sometimes referred to as "needles"), by the motor shaft coaxially arranged with the rotating shaft. The rotating shaft is supported via the rollers over a relatively long length in the axial direction, compared to the case where the rotating shaft is supported via bearing balls. Therefore, even if the rotating shaft is supported via the rollers at one point, it is possible to effectively suppress the inclination of the rotating shaft with respect to the motor shaft. The rollers may constitute a roller bearing together with the inner race and the outer race, so that the rotating shaft is supported by the motor shaft via the roller bearing. However, by arranging the rollers so that the rollers directly contact the outer peripheral surface of the rotating shaft and the inner peripheral surface of the motor shaft without providing the inner race and the outer race, the dimension of the actuator in the radial direction can be made considerably small.

The rotating shaft is supported by the housing via the thrust bearing. Thus, even if a large thrust force (axial force) acts on the rotating shaft when a large braking force is generated, the rotating shaft is securely supported while the rotation of the rotating shaft is maintained. Further, when a thrust ball bearing or an angular contact thrust bearing described later is employed, an alignment function can be expected, and thus, it is possible to effectively restrict radial displacement of the rotating shaft with respect to the housing.

(3) In the brake actuator according to the item (2), the thrust bearing is a thrust ball bearing.

The thrust ball bearing generally includes two washers and bearing balls interposed between the washers and serving as rolling elements. Each of the washers is a so-called bearing washer and is provided with an annular groove on which the bearing balls roll. The groove is recessed in a circular arc shape. With the function of the grooves, under a thrust load, a force to suppress relative displacement in the radial direction between the two washers acts on the washers receiving a thrust load. That is, the aligning force acts on the two washers. In the mode of the item (3), by utilizing the above aligning force, it is possible to suppress radial displacement of the rotating shaft with respect to the housing in a simple manner.

(4) In the brake actuator according to the items (2) or (3), the thrust bearing has a structure in which rolling elements are held between two washers, and relative displacement between one of the two washers and the rotating shaft in a radial direction is inhibited, and relative displacement between the other of the two washers and the housing in the radial direction is inhibited.

In the mode of the item (4), it is possible to more reliably expect an effect of the thrust bearing to suppress radial displacement of the rotating shaft.

(5) In the brake actuator according to any one of the items (2) to (4), the rotating shaft has a flange at the rear end, and the rotating shaft is rotatably supported, at the flange, by the housing via the thrust bearing.

In the mode of the item (5), the thrust bearing having a relatively large diameter can be employed. Therefore, the rotating shaft can be more firmly supported.

(6) In the brake actuator according to any one of the items (1) to (5), the speed reduction mechanism includes a first internal planetary gear mechanism and a second internal planetary gear mechanism, the first internal planetary gear mechanism having a first internal gear and a first external gear that contacts the first internal gear from inside to mesh with the first internal gear, the second internal planetary gear mechanism having a second internal gear and a second external gear that contacts the second internal gear from inside to mesh with the second internal gear, and the speed reduction mechanism includes a planetary gear body that is rotatably supported by an eccentric shaft portion of the motor shaft and in which one of the first internal gear and the first external gear and one of the second internal gear and the second external gear are disposed side by side in an axial direction, and the other of the first internal gear and the first external gear is provided on the housing, and the other of the second internal gear and the second external gear is provided on the rotating shaft.

(7) In the brake actuator according to the item (6), the first internal gear and the second internal gear each have an arc-shaped tooth profile, and the first external gear and the second external gear each have an epitrochoidal parallel curved tooth profile.

(8) In the brake actuator according to the items (6) or (7), the eccentric shaft portion, by which the planetary gear body is rotatably supported, is provided at a rear end of the motor shaft, the rotating shaft has a flange at the rear end of the rotating shaft, and an outer periphery of the flange is provided with the other of the second internal gear and the second external gear.

(9) In the brake actuator according to any one of the items (6) to (8), the first internal gear is fixedly supported by the housing, the first external gear is provided on an outer periphery of the planetary gear body, the second internal gear is provided on an inner periphery of the planetary gear body, and the second external gear is provided on the rotating shaft.

In the modes of the items (6) to (9), a limitation on the structure of the speed reduction mechanism, more specifically, a limitation that the speed reduction mechanism is a differential reduction gear is added. In the modes of the items (6) to (9), it is possible to achieve a speed reduction mechanism providing a high reduction ratio, that is, a speed reduction mechanism with a significantly small ratio of the rotation speed of the rotating shaft to the rotation speed of the motor shaft. In particular, in the mode of the item (7), a so-called cycloid speed reduction mechanism (also referred to as "Cyclo (registered trademark) speed reduction mechanism") is realized, which secures smooth deceleration. The flange in the mode of the item (8) may be the same as the flange described above, that is, the flange supported by the thrust bearing.

The specific layout of the first internal gear, the first external gear, the second internal gear, and the second external gear is not particularly limited, except for the mode of the item (9). For example, any of the following (A) to (D) may be employed.

(A) The first internal gear is provided on the housing, the first external gear is provided on the planetary gear body, the second internal gear is provided on the planetary gear body, and the second external gear is provided on the output shaft.

(B) The first internal gear is provided on the housing, the first external gear is provided on the planetary gear body, the second internal gear is provided on the output shaft, and the second external gear is provided on the planetary gear body.

(C) The first internal gear is provided on the planetary gear body, the first external gear is provided on the housing, the second internal gear is provided on the planetary gear body, and the second external gear is provided on the output shaft.

(D) The first internal gear is provided on the planetary gear body, the first external gear is provided on the housing, the second internal gear is provided on the output shaft, and the second external gear is provided on the planetary gear body.

In the modes of the items (6) to (9), as described above, the speed reduction mechanism is the differential reduction gear having the above structure. With such a differential reduction gear, a moment acts on the rotating shaft. That is, a force to cause the rotating shaft to be inclined acts on the rotating shaft. With the above support structure including the rollers and the thrust bearing, the inclination of the rotating shaft is effectively suppressed as described above. Therefore, the above four modes are suitable for the brake actuator including the differential reduction gear as the speed reduction mechanism.

(10) In the brake actuator according to any one of the items (1) to (9), the motion conversion mechanism includes: one of an external thread and an internal thread, which is provided on the rotating shaft; and a movable body that has the other of the external thread and the internal thread that is screwed with the one of the external thread and the internal thread, that is non-rotatable and configured to advance and retract, and that comes into contact with the piston, and radial displacement of contact faces of the movable body and the piston is permitted, the contact faces contacting each other.

The actuator according to the item (10) can be considered to have a function to permit radial displacement of the piston. The piston may receive a radial force while the braking force is generated, due to uneven wear of the friction members, inclination of the disc rotor caused by turning of the vehicle, or the like. In this case, by permitting the radial displacement of the piston, it is possible to reduce a load on the actuator. The radial displacement of the piston may be permitted accompanied by a change in inclination of the piston relative to the axis. That is, inclination of the piston may be permitted. When the inclination of the piston is permitted, it is possible to more appropriately reduce the burden.

(11) In the brake actuator according to the items (10), the contact faces of the movable body and the piston constitute a part of a spherical surface centered on a point on an axis of the brake actuator, the contact faces contacting each other.

In the mode of the item (11), it is possible to permit the inclination of the piston more smoothly. The center of the part of the spherical surface may be positioned more toward the front of the actuator than the contact faces, or may be positioned more toward the rear of the actuator than the contact faces.

What is claimed is:

1. A brake actuator for pressing a friction member against a rotating body that rotates with a vehicle wheel, the brake actuator comprising:
    a housing;
    an electric motor in which a hollow motor shaft rotates;
    a rotating shaft disposed inside the motor shaft so as to be coaxial with the motor shaft;
    a piston having a rear end that is disposed inside the motor shaft and a front end that is engaged with the friction member;
    a speed reduction mechanism configured to decelerate rotation transmitted from the motor shaft and transmit the rotation to the rotating shaft; and
    a motion conversion mechanism configured to convert a rotating motion of the rotating shaft into an advancing and retracting motion of the piston, wherein
    the motor shaft is rotatably supported by the housing at an outer peripheral surface of the motor shaft, and the rotating shaft is rotatably supported by an inner peripheral surface of the motor shaft via rollers at an outer peripheral surface of the rotating shaft as well as rotatably supported by the housing via a thrust bearing at a rear end of the rotating shaft, wherein:
    the speed reduction mechanism includes a first internal planetary gear mechanism and a second internal planetary gear mechanism, the first internal planetary gear mechanism having a first internal gear and a first external gear that contacts the first internal gear from inside to mesh with the first internal gear, the second internal planetary gear mechanism having a second internal gear and a second external gear that contacts the second internal gear from inside to mesh with the second internal gear; and
    the speed reduction mechanism includes a planetary gear body that is rotatably supported by an eccentric shaft portion of the motor shaft and in which one of the first internal gear and the first external gear and one of the second internal gear and the second external gear are disposed side by side in an axial direction, and the other of the first internal gear and the first external gear is provided on the housing, and the other of the second internal gear and the second external gear is provided on the rotating shaft.

2. The brake actuator according to claim 1, wherein the first internal gear and the second internal gear each have an arc-shaped tooth profile, and the first external gear and the second external gear each have an epitrochoidal parallel curved tooth profile.

3. The brake actuator according to claim 1, wherein the eccentric shaft portion, by which the planetary gear body is rotatably supported, is provided at a rear end of the motor shaft, the rotating shaft has a flange at the rear end of the rotating shaft, and an outer periphery of the flange is provided with the other of the second internal gear and the second external gear.

4. The brake actuator according to claim 1, wherein the first internal gear is fixedly supported by the housing, the first external gear is provided on an outer periphery of the planetary gear body, the second internal gear is provided on an inner periphery of the planetary gear body, and the second external gear is provided on the rotating shaft.

5. A brake actuator for pressing a friction member against a rotating body that rotates with a vehicle wheel, the brake actuator comprising:
    a housing;
    an electric motor in which a hollow motor shaft rotates;
    a rotating shaft disposed inside the motor shaft so as to be coaxial with the motor shaft;
    a piston having a rear end that is disposed inside the motor shaft and a front end that is engaged with the friction member;
    a speed reduction mechanism configured to decelerate rotation transmitted from the motor shaft and transmit the rotation to the rotating shaft; and
    a motion conversion mechanism configured to convert a rotating motion of the rotating shaft into an advancing and retracting motion of the piston, wherein
    the motor shaft is rotatably supported by the housing at an outer peripheral surface of the motor shaft, and the rotating shaft is rotatably supported by an inner peripheral surface of the motor shaft via rollers at an outer peripheral surface of the rotating shaft as well as rotatably supported by the housing via a thrust bearing at a rear end of the rotating shaft, wherein:
    the motion conversion mechanism includes
        one of an external thread and an internal thread, which is provided on the rotating shaft, and
        a movable body that has the other of the external thread and the internal thread that is screwed with the one of the external thread and the internal thread, that is non-rotatable and configured to advance and retract, and that comes into contact with the piston; and
    radial displacement of contact faces of the movable body and the piston is permitted, the contact faces contacting each other.

6. The brake actuator according to claim 5, wherein the contact faces of the movable body and the piston constitute a part of a spherical surface centered on a point on an axis of the brake actuator, the contact faces contacting each other.

* * * * *